(12) United States Patent
Rochelle

(10) Patent No.: US 6,460,901 B2
(45) Date of Patent: Oct. 8, 2002

(54) SPLIT THREAD NUT ASSEMBLY

(75) Inventor: Gary P. Rochelle, Marina del Rey, CA (US)

(73) Assignee: Alpha-Western Corporation, Gardena, CA (US)

( * ) Notice: Subject to any disclaimer, the term of this patent is extended or adjusted under 35 U.S.C. 154(b) by 0 days.

(21) Appl. No.: 09/788,290

(22) Filed: Feb. 13, 2001

(65) Prior Publication Data

US 2002/0109349 A1 Aug. 15, 2002

(51) Int. Cl.[7] ................................................. F16L 25/00
(52) U.S. Cl. ........................................ 285/387; 285/415
(58) Field of Search ................................ 285/388, 387, 285/386, 354, 415

(56) References Cited

U.S. PATENT DOCUMENTS

| | | | |
|---|---|---|---|
| 932,805 A | * 8/1909 | McLaughlin | ................. 285/387 |
| 944,877 A | * 12/1909 | Koschinski | ................. 285/388 |
| 1,201,022 A | 10/1916 | Conniff | |
| 1,244,100 A | 10/1917 | Kortas | |
| 2,112,290 A | 3/1938 | Holland | |
| 2,474,178 A | 6/1949 | Wurzburger | |
| 2,640,716 A | 6/1953 | Bigelow | |
| 3,113,792 A | 12/1963 | Brown | |
| 3,243,209 A | 3/1966 | Chertok | |
| 3,515,415 A | 6/1970 | Clark et al. | |
| 4,047,743 A | 9/1977 | Weintraub et al. | |
| 4,050,722 A | 9/1977 | Berger et al. | |
| 4,258,944 A | * 3/1981 | Wendel | ................. 285/387 X |
| 4,291,906 A | * 9/1981 | Donbavand | ............. 285/388 X |
| 4,516,278 A | 5/1985 | Lamond | |
| 4,623,123 A | 11/1986 | Traylor | |
| 4,676,479 A | 6/1987 | Ogawa et al. | |
| 4,778,204 A | 10/1988 | Berger | |
| 4,801,158 A | 1/1989 | Gomi | |
| 4,923,349 A | * 5/1990 | Logsdon | ................. 285/387 X |
| 5,092,636 A | 3/1992 | Judge | |
| 5,213,375 A | 5/1993 | Wu | |
| 5,308,122 A | 5/1994 | Crawford et al. | |
| 5,409,337 A | 4/1995 | Muyskens et al. | |
| 5,775,743 A | 7/1998 | Rochelle | |

FOREIGN PATENT DOCUMENTS

| | | |
|---|---|---|
| DE | 42 06 309 A1 | 9/1993 |
| DE | 42 06 309 | 9/1993 |
| GB | 807719 | 1/1959 |
| GB | 0807719 | 1/1959 |

* cited by examiner

Primary Examiner—Lynne H. Browne
Assistant Examiner—David E. Bochna
(74) Attorney, Agent, or Firm—Christensen O'Connor Johnson Kindness PLLC

(57) ABSTRACT

A split nut assembly (100) for joining a threaded pipe (90) with a flanged pipe (95), the split nut assembly having a two-piece split nut (110, 130) having locking pins (113, 133) that engage locking apertures (115, 135) to properly align the split nut. A locking ring (150) slidably engages the properly aligned split nut to hold the assembly together. Rectangular apertures (123, 143) are provided on the split nut, that engage corresponding channels (163) in the locking ring, whereby the locking ring is rotationally coupled to the split nut when assembled. Locking tabs (164) hold the locking ring in place after assembly. This split nut assembly allows the pipes to be joined without threading any hardware along the length of either pipe, and with the split nut threads (112, 132) engaging the pipe threads (92) without having to rotate the nut.

10 Claims, 4 Drawing Sheets

SPLIT THREAD NUT ASSEMBLY

FIELD OF THE INVENTION

This invention pertains to pipe fittings and, more particularly, fittings for coupling a flanged pipe to a threaded pipe.

BACKGROUND OF THE INVENTION

When assembling pipe for fluid equipment manufacture, plumbing, and other applications, it is often necessary to couple a flanged pipe to a threaded pipe. The conventional method of joining a flanged pipe to a threaded pipe utilizes a nut slidably disposed on the flanged pipe, the nut having a threaded portion that is large enough to fit over the flange and engage the threaded pipe. The nut includes an inwardly extending flange at its back end, whereby the aperture at the back end of the nut is smaller than the pipe flange, so that the flanged pipe is pulled toward, and held tightly to, the threaded pipe as the nut is tightened.

A disadvantage to this conventional method is that the nut cannot be slid over the flange on the pipe. The nut must therefore be slid onto the opposite end of the pipe, and along the length of the pipe to its final position. This requirement can be impractical and/or impossible when the opposite end of the flanged pipe is already connected to another apparatus or pipe, or when the pipe has an enlarged portion, bend, mounting bracket, or other impediment to sliding the nut along the length of the pipe. Another disadvantage of this conventional method is that assembly and disassembly of the joint generally requires that a length of the flanged pipe equal to the axial length of the nut be free from obstruction. This obstruction-free length is required in order to allow sufficient room to back the nut off of the threaded portion of the pipe. In many plumbing applications it is desirable to locate components very close together, and the conventional nut for flanged pipes presents an undesirable design constraint.

There have been attempts in the prior art to remedy these problems. One example of a previously available nut configuration is shown in U.S. Pat. No. 4,516,278 to Lamond. Lamond discloses a plumbing trap with a collar for connecting a flanged pipe to a threaded pipe. Lamond uses a collar nut that has two opposed locking ears that extend inward. The locking ears engage the flange of the flanged pipe by temporarily deforming and snapping over the flange of the flanged pipe. Lamond also discloses a ferrule and a split brass washer that are received in the nut between the ends of the flanged pipe and the threaded pipe for sealing.

U.S. Pat. No. 1,244,100 to Kortas discloses a pipe coupling utilizing a split reducer having a threaded inner aperture for engaging the threaded portion of the pipe, and a threaded outer portion. A threaded casing screws onto the split reducer to hold them together so that the assembled unit essentially replicates the conventional nut described above. Assembly is complicated, however, requiring first utilizing lugs at the ends of the split reducer to screw the reducer into the casing, and then screwing the unit onto the threaded pipe. In addition no mechanism is provided to properly align the threaded reducer halves so that they properly engage the casing.

U.S. Pat. No. 1,201,022 to Conniff similarly discloses a pipe coupling that uses a split nut with a locking ring for holding the split nut together. Conniff, however, teaches using a circumferential groove on the locking ring inner surface that accommodates a pair of narrow lugs on the split nut. This invention is also difficult to use, however, requiring that a first half of the split nut be first inserted through a longitudinal groove in the locking ring to engage the circumferential groove, then the locking ring is rotated 180 degrees and the second half of the split ring nut is inserted through the same longitudinal groove to engage the circumferential groove. The assembled unit is then screwed onto the threaded portion of the pipe in a manner similar to the conventional nut described above.

In U.S. Pat. No. 5,775,743 to Rochelle, the inventor of the present application discloses a two-piece nut assembly including a nut having an inside diameter that slides over a pipe flange, and a one-piece split insert that fits within the nut to retain nut on the flange. While providing an innovative solution to the disadvantages of conventional couplings discussed above, the split ring must be twisted out of shape for installation.

It will be appreciated that all of these prior art designs incorporate a locking ring or nut that must be unscrewed, and therefore assembly and disassembly will require that the nut move laterally along the flanged pipe for a distance at least equal to the length of the nut. Therefore (assuming a typical joint wherein the threaded and flanged pipes are laterally constrained) a portion of the flanged pipe must remain free of obstructions, to permit disassembly of the joint.

What is needed, therefore, is a coupling assembly for joining a threaded pipe to a flanged pipe that is easy to use, can be installed without requiring sliding a coupling nut along the length of the pipe, and minimizes the length of the flanged pipe that must be kept free of obstruction.

SUMMARY OF THE INVENTION

A split nut assembly for releasably coupling a pipe having an externally threaded end with a pipe having an annular flange is disclosed. The split nut assembly includes a two-piece split nut having a threaded inner surface adapted to engage the threaded pipe end and an inwardly disposed flange portion adapted to engage the flanged pipe end. At least one protrusion is provided on the outer surface of the two-piece split nut. A locking ring having at least one inwardly disposed channel slidably engages the two-piece split nut, with the channel(s) on the locking ring aligned with the protrusion(s) on the split nut, thereby holding the split nut together.

In an embodiment of the invention the split nut includes at least four rectangular protrusions that are aligned parallel to the axis of the split nut, and the locking ring has similarly disposed channels.

In an aspect of the invention, an inwardly projecting locking tab is provided in each channel that engages the split nut protrusion when the split nut is fully inserted into the locking ring.

In another aspect of the invention the locking ring may engage the split nut from the threaded pipe side of the joint whereby only a minimal length of the flanged pipe need be free of obstruction.

In an embodiment of the invention, the split nut is provided with a plurality of circumferentially-oriented locking pins and corresponding locking apertures that engage to facilitate proper alignment of the split nut portions.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
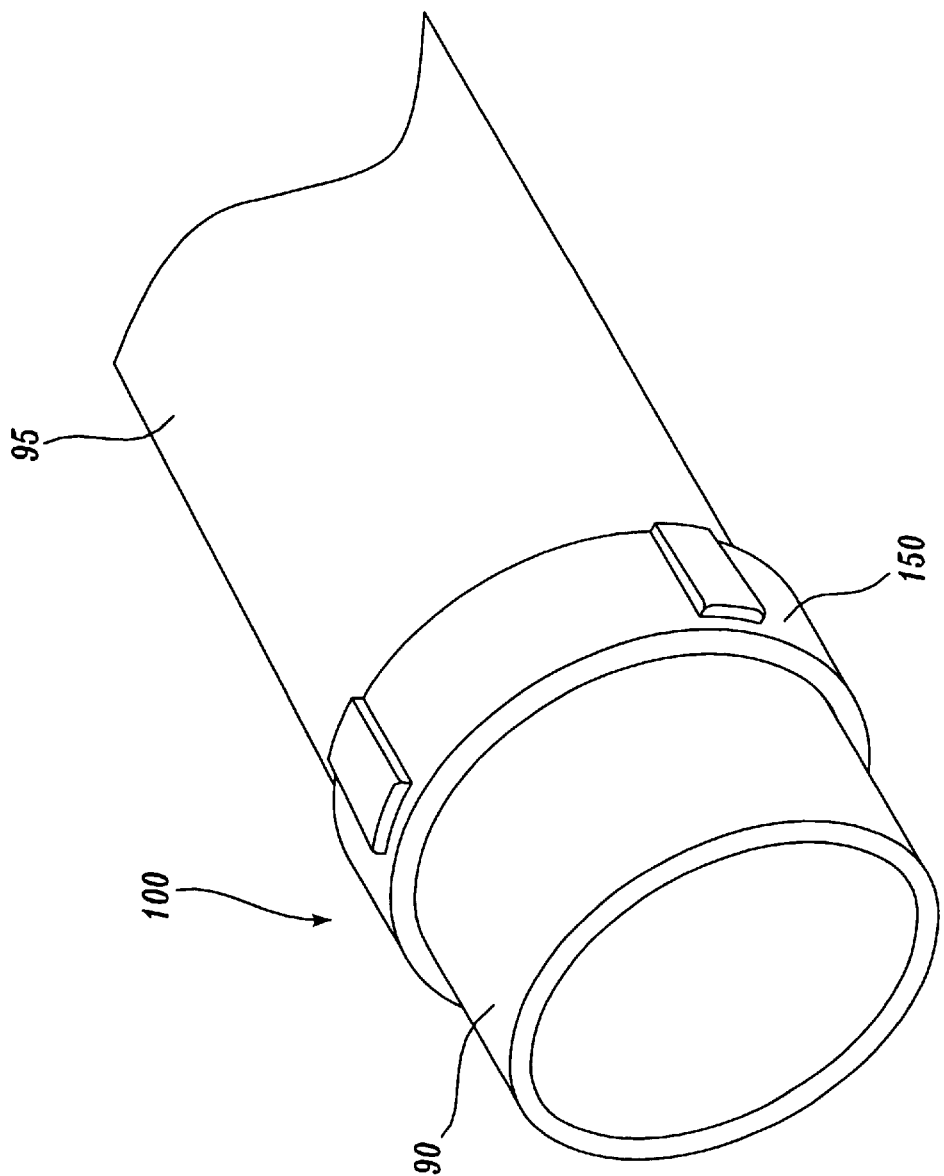
FIG. 1 shows a split thread nut assembly of the present invention installed to join a pipe having a threaded end to a pipe having a flanged end.
Figure 2:
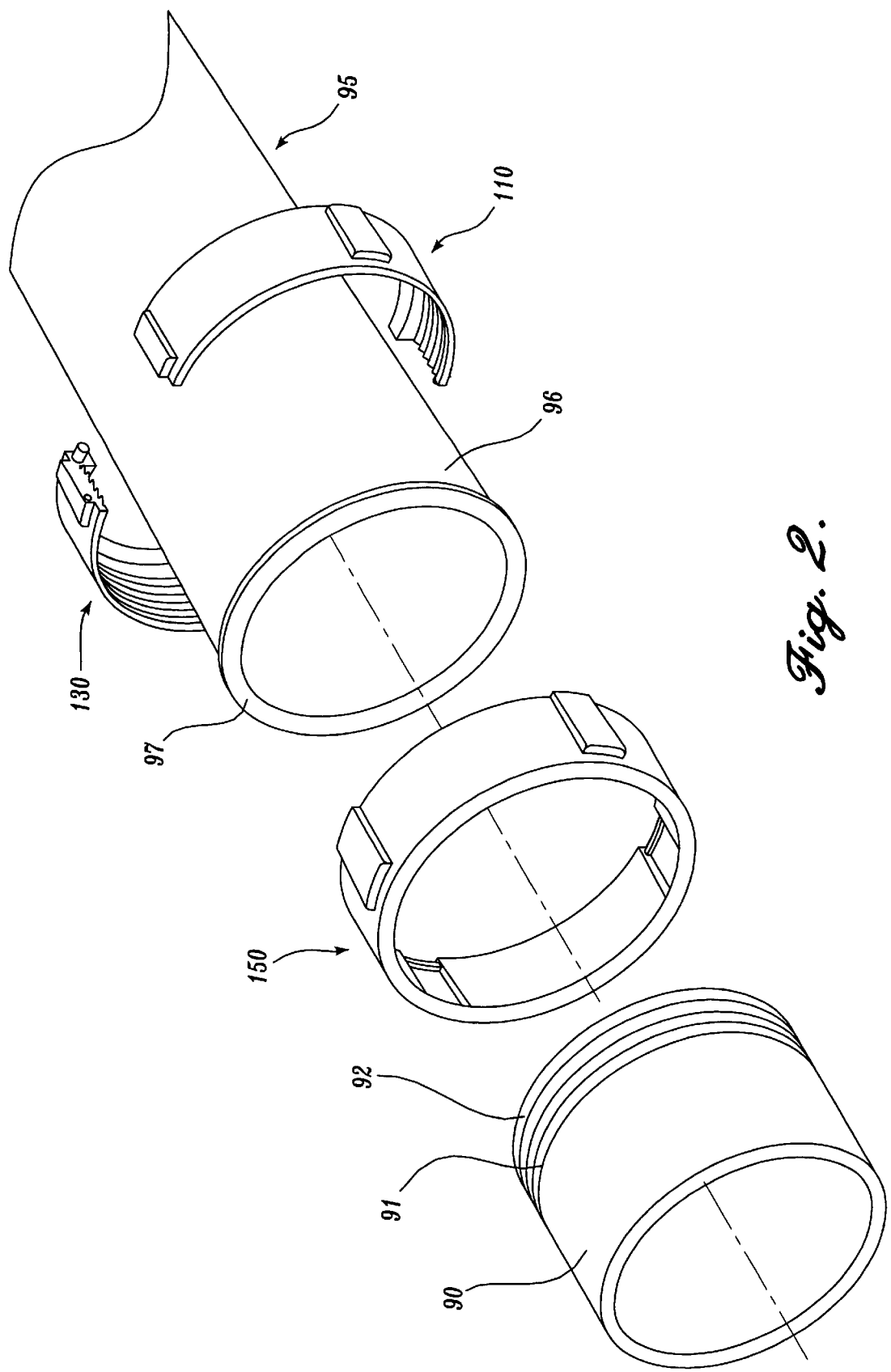
FIG. 2 shows an exploded view of the split thread nut assembly shown in FIG. 1.

Referring now to FIG. 1, a fully assembled split thread nut assembly 100 according to the present invention is shown connecting a flanged pipe 95 to a threaded pipe 90. As seen most clearly in FIG. 2, the flanged pipe 95 has an outwardly extending end flange 97 at the pipe end 96 and the threaded pipe 90 includes a threaded end portion 92 at the pipe end 91. The flanged pipe 95 and the threaded pipe 90 are axially aligned, and may have approximately equal pipe internal diameters. The outer diameter of the flange 97 is approximately equal to the outer diameter of the threaded end portion 92 and the two pipes 90, 95 butt up against each other to cooperatively form a continuous flow channel. The split thread nut assembly 100 of the present invention has particular advantages when the flanged pipe 95 has a larger diameter portion, i.e., a portion having a diameter greater than or equal to the outer diameter of the flange 97, or in applications where there is an obstruction such as a pipe support or an equipment casing near the flange 97 of the flanged pipe 95. In these applications it may be inconvenient or impossible to utilize a conventional, single-piece threaded nut. It should be appreciated, however, that the present invention is not intended to be limited to such applications, and it is contemplated that the invention may be used in other applications, including joining of two straight and/or constant diameter pipes, and joining pipes having different sized flow channels.

Figure 3:
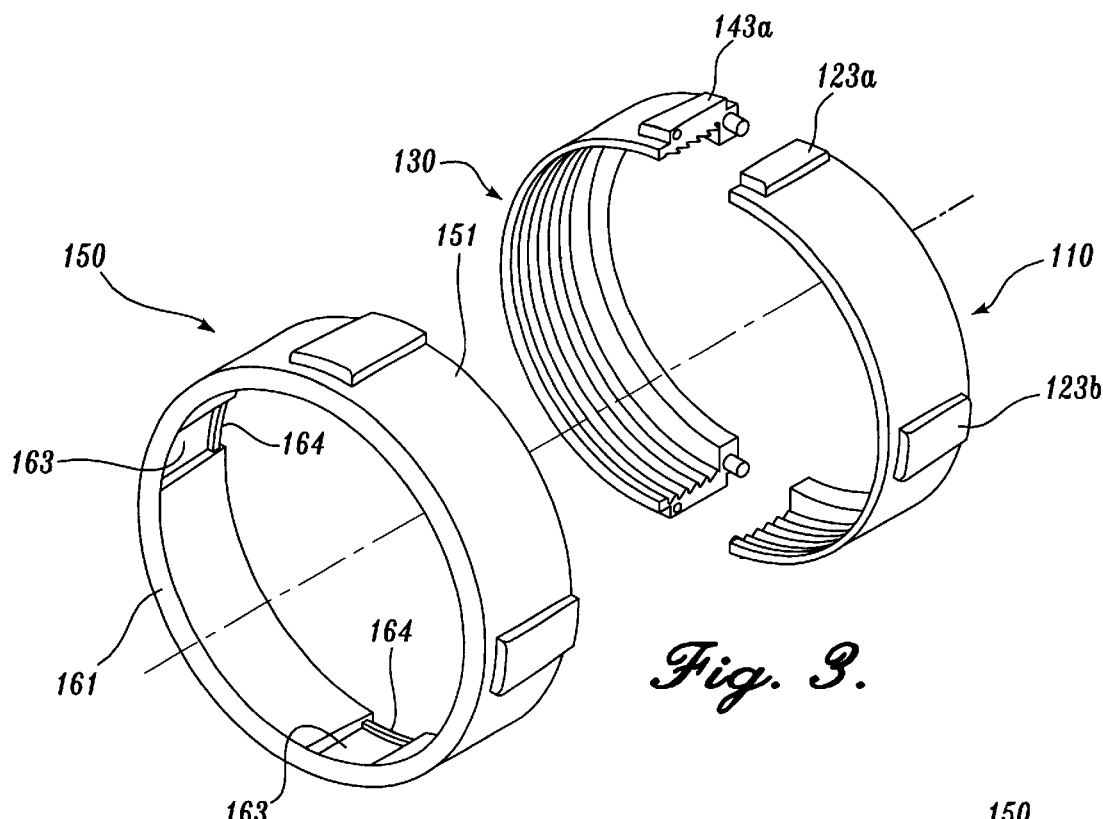
FIG. 3 shows a perspective view of the split nut and locking ring shown in FIG. 1.

The split thread nut assembly 100 shown without pipes 90 and 95 for clarity in FIG. 3 includes a split hut having a first nut half 110, a second nut half 130, and a locking ring 150 that releasably connects the first nut half 110 to the second nut half 130. The first nut half 110 and second nut half 130 cooperatively form a threaded nut that is adapted to engage the threaded portion 92 of the threaded pipe 90. The locking ring 150 slidably engages the first nut half 110 and the second nut half 130, releasably securing the nut halves 110, 130 together.

Figure 6:
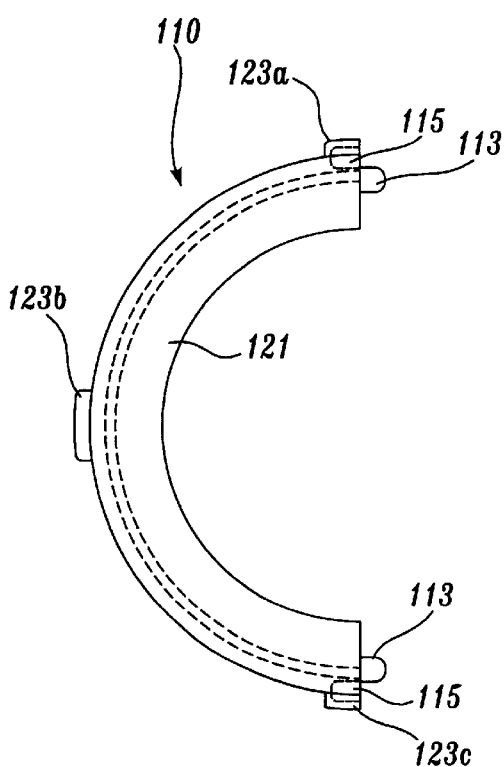
FIG. 6 shows a front view of the left half split nut shown in FIG. 1.
Figure 7:
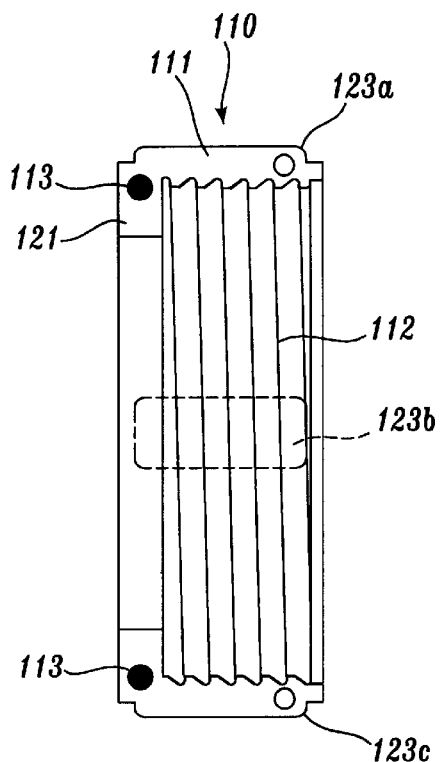
FIG. 7 shows a side view of the left half split nut shown in FIG. 6.

A front view of the first nut half 110 is shown in FIG. 6, and a side view is shown in FIG. 7. The first nut half 110 includes a half-tubular portion 111 having internal threads 112, and a flange portion 121 extending inwardly from the back end of the half-tubular portion 111. Each end of the first nut half 110 has a circumferentially extending locking pin 113 extending generally from the flange portion 121 and a circumferentially-oriented locking aperture 115 disposed near the front end of the first nut half 110. The outer surface of the half-tubular portion 111 includes a plurality of generally rectangular protrusions 123a, 123b, and 123c that are aligned parallel to the symmetry axis of the first nut half 10. In the disclosed embodiment, the protrusions 123a and 123c abut opposite ends of the first nut half 110, and are approximately half as wide as the protrusion 123b.

Figure 8:
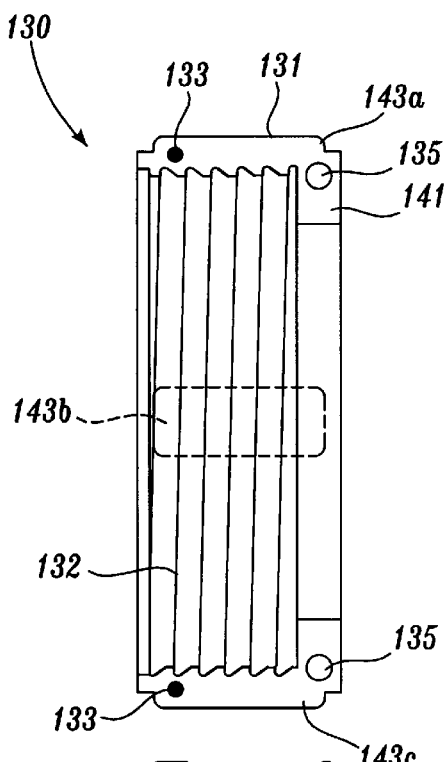
FIG. 8 shows a side view of the right half split nut shown in FIG. 1.
Figure 9:
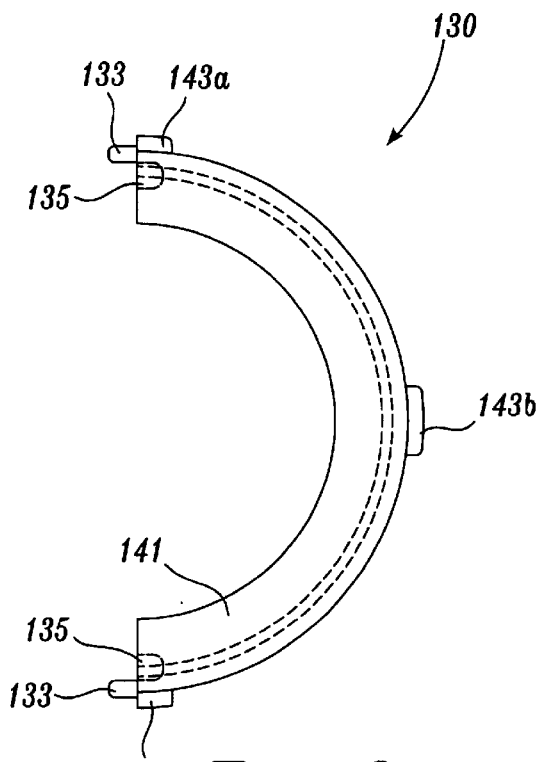
FIG. 9 shows a front view of the right half split nut shown in FIG. 8.

A front view of the second nut half 130 is shown in FIG. 8, and a side view is shown in FIG. 9. The second nut half 130 is very similar to the first nut half 110, and includes a half-tubular portion 131 having internal threads 132, and a flange portion 141 extending inwardly from the back end of the half-tubular portion 131. Each end of the second nut half 130 has a circumferentially-extending locking pin 133 extending from near the front end of the second nut half 130, and a circumferentially-oriented locking aperture 135 disposed generally at the flange portion 141. The outer surface of the half-tubular portion 131 includes a plurality of generally rectangular protrusions 143a, 143b, and 143c that are aligned parallel to the symmetry axis of the second nut half 130. The protrusions 143a and 143c abut opposite ends of the second nut half 130, and are approximately half as wide as the protrusion 143b.

It will be appreciated by comparing FIGS. 6 and 7 to FIGS. 8 and 9 that the locking pins 113 on the first nut half 110 are positioned to engage the locking apertures 135 in the second nut half 130 when the locking pins 133 on the second nut half 130 engage the locking apertures 115 in the first nut half 110. When the first and second nut halves 110, 130 are so engaged, they form a nut having internal threads 112, 132 that are adapted to cooperatively engage the threaded end portion 92 of the threaded pipe 90. The flanged portions 121, 141 cooperatively form a circular flange having an internal diameter that is smaller than the outer diameter of the flange 97 on the flanged pipe 95. Moreover, the adjacent rectangular protrusions 121a, 141a, and 121c, 141c, respectively, each cooperatively forms a rectangular protrusion similar to rectangular protrusions 121b and 141b.

Figures 4, 5:
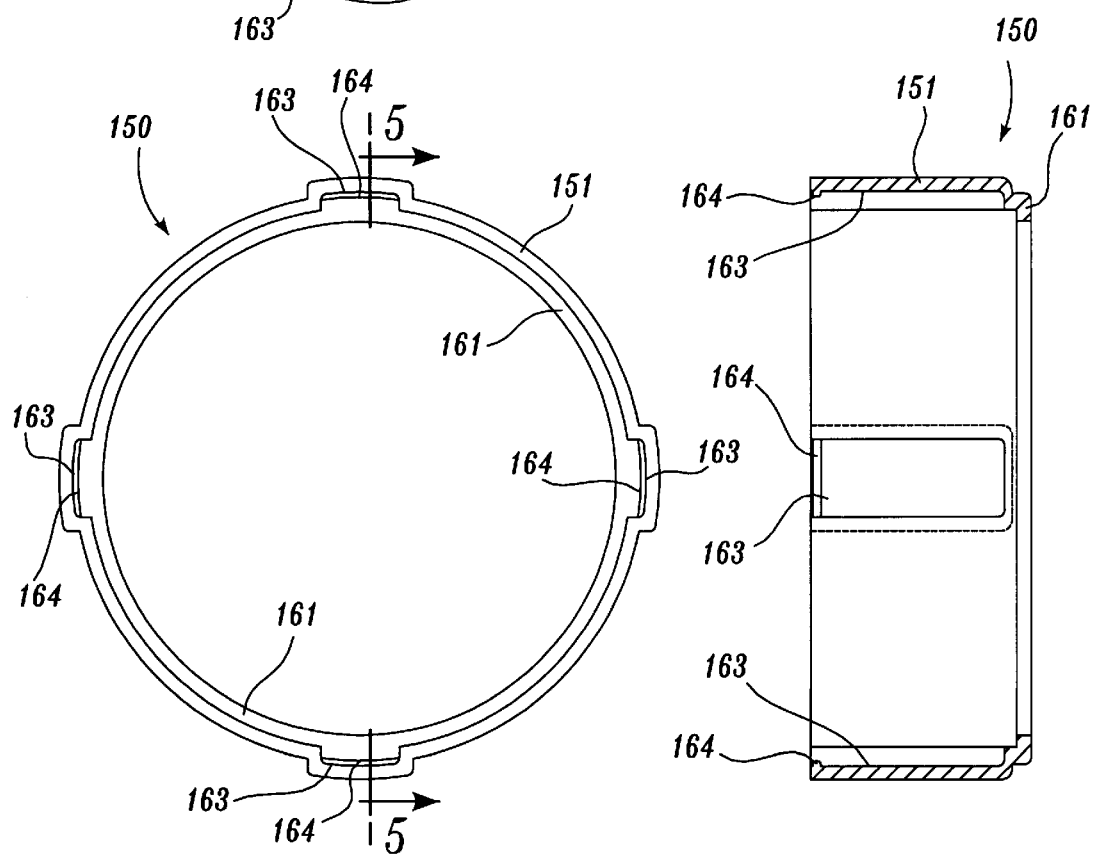
FIG. 4 shows a front view of the locking ring shown in FIG. 1.
FIG. 5 shows a sectional view through 5—5 of the locking ring shown in FIG. 4.

A front view of the locking ring 150 is shown in FIG. 4 and a sectional side view of the locking ring 150 is shown in FIG. 5. The locking ring 150 includes a generally tubular portion 151 with an inwardly extending rim 161 at one end. The tubular portion 151 of the locking ring 150 includes a plurality of longitudinal rectangular channels 163 that are open at the front end of the locking ring 150. The rectangular channels 163 are sized to slidably receive the rectangular protrusions 123b, 143b, and pairs 123a, 143a, and 123c, 143c. The internal diameter of the tubular portion 151 is slightly greater than the outer diameter of the tubular section formed by half-tubular portions 111 and 131, when the first half nuts 110 and 130 are engaged as discussed above, whereby the locking ring 150 can slidably receive the engaged first and second nut halves 110, 130 when the rectangular channels 163 are aligned with the rectangular protrusions 123, 143(a, b, c).

The open end of each rectangular channel 163 includes a locking tab 164 that engages the back end of the rectangular protrusions 123, 143 when the engaged first and second nut halves 110, 130 are fully inserted into the locking ring 150. The locking ring rim 161 is narrow, and provides a stop for the nut halves 110, 130 when they are slidably inserted into the locking ring 150. The rim 161 is sufficiently narrow that it will not interfere with when the split thread nut assembly 100 is screwed onto the threaded pipe 90.

The preferred method of using the split thread nut assembly 100 is as follows. Place the locking ring 150 around the threaded pipe 90 and place the flange 97 against the threaded portion 92 with the pipes axially aligned. Join the first nut half 110 with the second nut half 130 by aligning the locking pins 113 and 133 with the locking apertures 135 and 115, respectively, and pushing the nut halves 110, 130 together such that the threaded portions 112 and 132 engage the threaded end portion 92 of the threaded pipe 90, and the flange portions 121 and 141 are disposed behind the flange 97 of the flanged pipe 95. Slide the locking ring 150 over the joined nut halves 110, 130 until the locking tabs 164 snap into place behind the rectangular protrusions, and tighten the assembly, as needed. It will be apparent that the present invention allows the split nut halves 110, 130 to be assembled with the split nut already screwed onto the threaded pipe 90, eliminating, or greatly decreasing, the amount that the split nut must be rotated to firmly connect the pipes. This is particularly advantageous in applications where there the space for manipulating the joint is limited, and in mass production applications wherein a large number of split nuts must be installed.

Moreover, in the preferred embodiment the locking ring 150 may be oriented to engage the assembled split nut halves 110, 130 from either the flanged pipe 95 side of the joint, or from the threaded pipe 90 side of the joint. It will be appreciated, therefore, that the split nut halves 110, 130 may be assembled with the threads engaging the threaded pipe 90, and the locking ring 150 may engage the split nut from the threaded pipe side, so that the joint can be assembled even if there is an obstruction very close to the flange 97. Only a free length equal to the axial thickness of the flanged portions 121, 141 need be available on the flanged pipe to assemble the joint. It well also be apparent that the split nut assembly 100 can be easily assembled and disassembled by hand, with no, or minimal, turning of the nut required, by simply sliding the locking ring 150 axially on or off the split nut halves 110, 130.

The split thread nut assembly 100 may be made from any suitably rigid material or combination of materials, as are well known in the art, including metals, hard plastics such as PVC, and the like. It will be appreciated that although certain advantages are inherent in the preferred embodiment disclosed, a number of variations may be made to the disclosed embodiment without departing from the invention. For example, a different number and/or shape of protrusions 123, 143 and channels 163 may be used. The rim 161 and/or locking tabs 164 may be eliminated, or incorporated as shorter elements. Rather than using locking pins 113, 133 and apertures 115, 135, other mechanisms for properly aligning the nut halves may be employed, such as mirrored notches or interlocking elements, or no alignment mechanism could be employed, relying solely on the locking ring to properly align the nut halves.

The present invention is believed to provide a reliable split nut assembly that is much easier to assemble and use than all prior art devices.

While the preferred embodiment of the invention has been illustrated and described, it will be appreciated that various additional changes can be made therein without departing from the spirit and scope of the invention.

The embodiments of the invention in which an exclusive property or privilege is claimed are defined as follows:

1. A split nut assembly for releasably coupling a threaded pipe end with a flanged pipe end, the split nut assembly comprising:

a two-piece split nut having a first end that includes a threaded inner surface adapted to engage the threaded pipe end, an outer surface having at least one protrusion, and an inwardly disposed flange portion adapted to engage the flanged pipe end; and a locking ring having at least one inwardly disposed channel, the locking ring being adapted to slidably receive the two-piece split nut from the first end when the at least one protrusion on the nut is aligned with the at least one channel on the ring, such that when the locking ring slidably receives the two-piece nut the locking ring and the two-piece nut are rotationally interlocked.

2. The split nut assembly of claim 1, wherein the at least one protrusion on the outer surface of the two-piece split nut is a rectangular protrusion that is aligned parallel to the two-piece split nut axis.

3. The split nut assembly of claim 2, further comprising at least one inwardly projecting locking tab disposed in the at least one channel such that the at least one locking tab engages the at least one protrusion when the two-piece split nut is fully received by the locking ring.

4. The split nut assembly of claim 2, wherein a two-piece split nut comprises at least four rectangular protrusions and the locking ring comprises at least four channels, such that the protrusions can all be simultaneously aligned with a channel.

5. The split nut assembly of claim 1, further comprising at least two locking pins and at least two locking apertures, all disposed on the two-piece locking nut and located such that the two-piece locking nut is joined in the desired orientation when the at least two locking pins are inserted into the at least two locking apertures.

6. The split nut assembly of claim 1, wherein the two-piece split nut can be assembled with the threaded inner surface engaging the threaded pipe end.

7. A split nut assembly for releasably joining a first pipe portion having a threaded end with a second pipe portion having a flanged end, the split nut assembly comprising:

- a first nut half and a second nut half wherein the first and second nut halves cooperatively form an internally threaded tube adapted to engage the threaded end of the first pipe, and an inwardly extending flange having a minimum diameter that is less than the diameter of the second pipe flanged end;
- means for properly aligning the first nut half with the second nut half;
- a locking ring adapted to slide over the perimeter of the properly aligned first and second nut halves "wherein the locking ring slides over the first and the second nut halves from the side opposite the inwardly extending flange"; and
- cooperative means on the first and second nut halves and the locking ring for rotationally coupling the locking ring to the first and second nut halves when the locking ring is slid around the nut halves.

8. The split nut assembly of claim 7, wherein the means for properly aligning first nut half with the second nut half comprises a plurality of locking pins and locking apertures that slidably engage when the nut halves are aligned in the desired orientation.

9. The split nut assembly of claim 7, wherein the cooperative means for rotationally coupling the locking ring to the nut halves comprises outwardly disposed rectangular protrusions on the nut halves and inwardly disposed channels on the locking ring that are adapted to slidably receive the rectangular protrusions.

10. The split nut assembly of claim 7, wherein the first nut half and the second nut half can be assembled in the desired orientation with the threaded inner surfaces engaging the threaded end of the first pipe.

* * * * *

UNITED STATES PATENT AND TRADEMARK OFFICE
CERTIFICATE OF CORRECTION

PATENT NO.    : 6,460,901 B2
DATED         : October 8, 2002
INVENTOR(S)   : G. P. Rochelle It is certified that error appears in the above-identified patent and that said Letters Patent is hereby corrected as shown below:

<u>Column 7,</u>
Line 20, "flange"; and" should read -- flange; and --

Signed and Sealed this

Twentieth Day of May, 2003

JAMES E. ROGAN
*Director of the United States Patent and Trademark Office*